(12) United States Patent
Pylappan et al.

(10) Patent No.: US 10,701,521 B2
(45) Date of Patent: Jun. 30, 2020

(54) AUGMENTED LOCATION DETERMINATION USING SENSOR DATA

(71) Applicant: Curbside Inc., Palo Alto, CA (US)

(72) Inventors: Seejo Pylappan, Cupertino, CA (US); Denis Laprise, Sunnyvale, CA (US); Jaron Waldman, Palo Alto, CA (US)

(73) Assignee: CURBSIDE INC., Palo Alto, CA (US)

( * ) Notice: Subject to any disclaimer, the term of this patent is extended or adjusted under 35 U.S.C. 154(b) by 0 days.

(21) Appl. No.: 16/402,368

(22) Filed: May 3, 2019

(65) Prior Publication Data

US 2019/0342717 A1 Nov. 7, 2019

Related U.S. Application Data

(60) Provisional application No. 62/666,416, filed on May 3, 2018, provisional application No. 62/666,451, filed on May 3, 2018.

(51) Int. Cl.
*H04W 4/029* (2018.01)
*H04W 4/02* (2018.01)
(Continued)

(52) U.S. Cl.
CPC ............. *H04W 4/029* (2018.02); *G01S 19/48* (2013.01); *G01S 19/49* (2013.01); *G06Q 10/063114* (2013.01); *G06Q 30/0633* (2013.01); *G08B 21/22* (2013.01); *G08G 1/205* (2013.01); *H04L 67/18* (2013.01); *H04L 67/20* (2013.01); *H04L 67/2823* (2013.01); *H04W 4/021* (2013.01); *H04W 4/023* (2013.01); *H04W 4/025* (2013.01);
(Continued)

(58) Field of Classification Search
CPC ......... G01S 19/48; G01S 19/49; G06Q 19/48; H04W 4/029; H04W 4/023
USPC ........................................................ 455/456.2
See application file for complete search history.

(56) References Cited

U.S. PATENT DOCUMENTS 8,340,904 B2 * 12/2012 Lin ..................... G08G 1/123
  701/465
8,793,033 B2 * 7/2014 Schuerman ............ G01C 21/26
  701/1

(Continued)

OTHER PUBLICATIONS

International Search Report and Written Opinion dated Jul. 19, 2019 for corresponding PCT Application No. PCT/US2019/030580.

*Primary Examiner* — Congvan Tran
(74) *Attorney, Agent, or Firm* — Polsinelli PC

(57) ABSTRACT

Systems, methods and computer-readable medium are provided using on-board sensor data of a tracking device in addition to satellite signals to improve the determination of the location of a tracking device. In one aspect, a method includes detecting, at a server, presence of a tracking device in a high error zone; determining if geographical coordinates of a current location of the tracking device in the high error zone are within a threshold of registered geographical coordinates of the current location; activating at least one sensor on-board the tracking device when the geographical coordinates are not within the threshold; receiving displacement information of the tracking device from the tracking device; determining an updated location of the tracking device based on the current location and the displacement information; and providing an arrival alert to a destination toward which the tracking device is traveling based on the updated location.

20 Claims, 5 Drawing Sheets

(51) Int. Cl.
- *G06Q 10/06* (2012.01)
- *G01S 19/49* (2010.01)
- *G01S 19/48* (2010.01)
- *G08B 21/22* (2006.01)
- *H04W 4/021* (2018.01)
- *H04L 29/08* (2006.01)
- *H04W 4/23* (2018.01)
- *H04W 4/38* (2018.01)
- *H04W 4/70* (2018.01)
- *H04W 4/80* (2018.01)
- *H04W 4/12* (2009.01)
- *H04W 64/00* (2009.01)
- *H04W 88/04* (2009.01)
- *G06Q 30/06* (2012.01)
- *G08G 1/00* (2006.01)
- *G06N 20/00* (2019.01)
- *G01S 19/13* (2010.01)

(52) U.S. Cl.
CPC .............. *H04W 4/12* (2013.01); *H04W 4/23* (2018.02); *H04W 4/38* (2018.02); *H04W 4/70* (2018.02); *H04W 4/80* (2018.02); *H04W 64/003* (2013.01); *H04W 88/04* (2013.01); *G01S 19/13* (2013.01); *G06N 20/00* (2019.01)

(56) References Cited

U.S. PATENT DOCUMENTS

| | | |
|---|---|---|
| 2004/0177109 A1* | 9/2004 | Lee .................. G08G 1/202 709/201 |
| 2012/0326922 A1 | 12/2012 | Yang et al. |
| 2013/0131982 A1* | 5/2013 | Siris .................. G01S 19/07 701/470 |
| 2014/0232570 A1 | 8/2014 | Skinder et al. |
| 2014/0232593 A1 | 8/2014 | Varoglu |
| 2015/0073703 A1 | 3/2015 | Jouaux et al. |
| 2016/0070448 A1* | 3/2016 | Krol .................. G01C 21/00 715/802 |
| 2016/0155088 A1 | 6/2016 | Pylappan et al. |
| 2019/0031219 A1* | 1/2019 | Takewa .............. G01S 19/396 |
| 2019/0128676 A1* | 5/2019 | Naik .................. G01C 21/206 |

* cited by examiner

AUGMENTED LOCATION DETERMINATION USING SENSOR DATA

CROSS REFERENCE TO RELATED APPLICATIONS

This Application claims priority to U.S. Provisional Application 62/666,416 filed on May 3, 2018 and U.S. Provisional Application 62/666,451 filed on May 3, 2018, the entire content of both of which are incorporated herein by reference.

TECHNICAL FIELD

The present technology pertains to systems and methods for improving location determination of tracking devices, and more specifically pertains to using on-board sensor data of the tracking device in addition to satellite signals to improve the determination of the location of a tracking device.

BACKGROUND

Current services that provide arrival alerts often rely on receiving continuous location updates from a moving target (e.g., a vehicle) in order determine, as accurately as possible, a timing of alerting the destination (e.g., a store) of the moving target's arrival at the destination. For example, when a user is driving to a location of a store to pick up an ordered item, the system's objective is to provide an accurate advance alert (arrival alert) to the operator of the store so that the operator can ensure the user's order is ready for pick when the user arrives.

The requirement for such continuous transmission of location updates from a tracking device (e.g., a mobile device) associated with the moving target to the server, requires the server to obtain accurate location information (e.g., accurate reading of global positioning system (GPS) signals from the tracking device). However, there are many geographical areas in which a tracking device may not be able to obtain accurate GPS signals due to the existence of many structures and buildings in the surrounding areas of the tracking device (e.g., in a downtown area, under a bridge, in a secure building, in a mall, etc.). This can adversely affect the reading provided by the tracking device to the server, which can in turn adversely affect the timing of sending the arrival alert to the destination.

SUMMARY

Example embodiments are provided for using on-board sensor data of a tracking device in addition to satellite signals to improve the determination of the location of a tracking device.

In one aspect, a method includes detecting, at a server, presence of a tracking device in a high error zone; determining if geographical coordinates of a current location of the tracking device in the high error zone are within a threshold of registered geographical coordinates of the current location; activating at least one sensor on-board the tracking device when the geographical coordinates are not within the threshold; receiving displacement information of the tracking device from the tracking device; determining an updated location of the tracking device based on the current location and the displacement information; and providing an arrival alert to a destination toward which the tracking device is traveling based on the updated location.

In one aspect, a server includes memory having computer-readable instructions stored therein; and one or more processors. The one or more processors are configured to execute the computer-readable instructions to detect presence of a tracking device in a high error zone; determine if geographical coordinates of a current location of the tracking device in the high error zone are within a threshold of registered geographical coordinates of the current location; activate at least one sensor on-board the tracking device when the geographical coordinates are not within the threshold; receive displacement information of the tracking device from the tracking device; determine an updated location of the tracking device based on the current location and the displacement information; and provide an arrival alert to a destination toward which the tracking device is traveling based on the updated location.

In one aspect, one or more non-transitory computer-readable medium have computer-readable instructions stored thereon, which when executed by one or more processors, cause the one or more processors to detect presence of a tracking device in a high error zone; determine if geographical coordinates of a current location of the tracking device in the high error zone are within a threshold of registered geographical coordinates of the current location; activate at least one sensor on-board the tracking device when the geographical coordinates are not within the threshold; receive displacement information of the tracking device from the tracking device; determine an updated location of the tracking device based on the current location and the displacement information; and provide an arrival alert to a destination toward which the tracking device is traveling based on the updated location.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to obtain accurate readings of a location of a tracking device using sensor data, where GPS signals alone may not be sufficiently accurate. This improved location determination technique can in turn improve the accuracy of arrival alerts provided by a service provider to a destination (e.g., a merchant) informing the destination of the impending arrival of a moving target (e.g., a user or customer) at the destination.

The disclosure begins with a description of several example systems in which the concepts described herein can be implemented.

Figure 1:
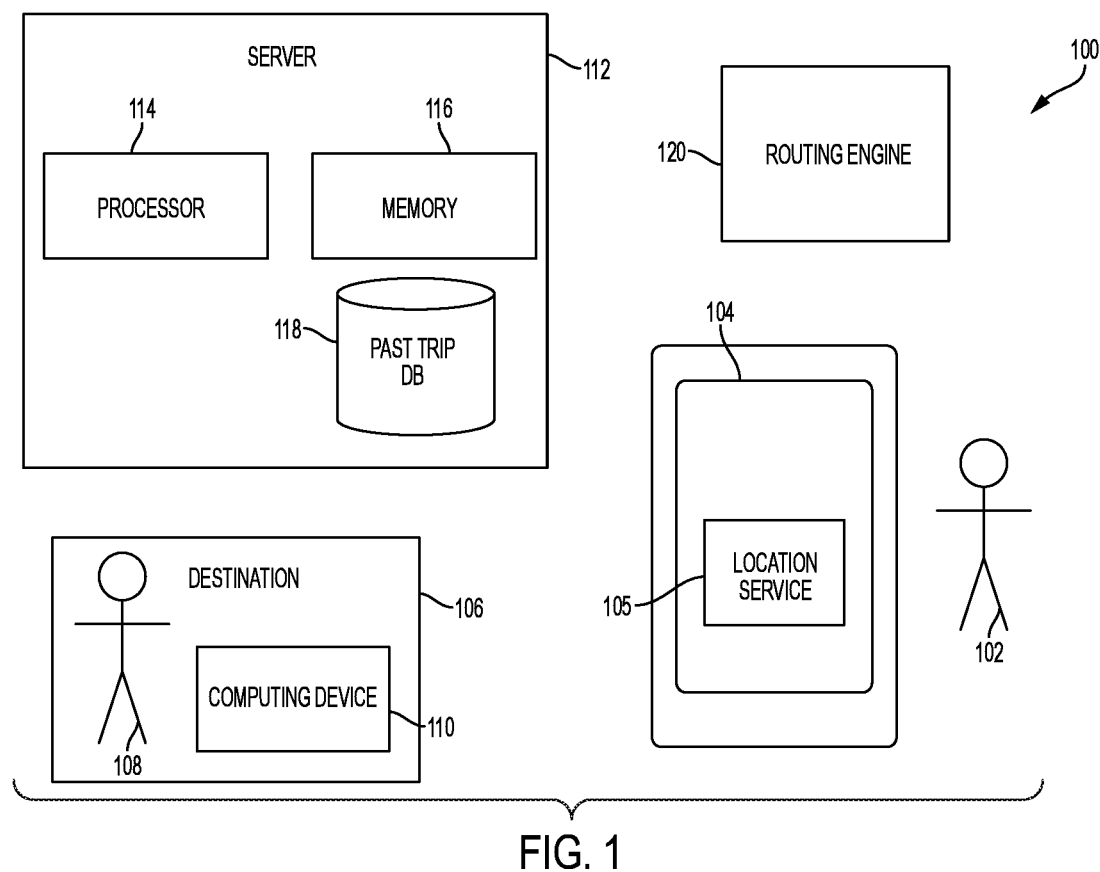
FIG. 1 shows an example system in accordance with one aspect of the present disclosure.

FIG. 1 illustrates an example system in accordance with one aspect of the present disclosure. As illustrated in FIG. 1, system 100 includes a user 102 associated with a tracking device 104 (user device 104 or customer device 104). While not shown in FIG. 1, user 102 and tracking device 104 can be associated with a moving object including, but not limited to, a car, a bus, a bike, a public transportation vehicle, etc. The tracking device 104 can be any known or to be developed electronic device capable of tracking a movement of the user 102 (and the associated moving object) and communication the same with a server 112 over a wired and/or wireless communication platform such as over a cellular network or a WiFi connection. Examples of tracking device 104 include, but are not limited to, a cellular phone, a personal digital assistant (PDA), a laptop, a tablet, a wristband tracking object, etc. In one example, tracking device 104 has location service 105. Location service 105 can be any known or to be developed built-in sensor, device and/or location determining component such as a global positioning system (GPS) device capable of recording geographical coordinates (e.g., latitude and longitude) of tracking device 104 at any given point in time.

While not shown in FIG. 1, tracking device 104, server 112 and any other component of system 100 have other components for enabling communication with other components such as transceivers.

The system 100 further includes a destination 106. Destination 106 can be a target location that is to receive arrival alerts from server 112 informing an operator thereof of the timing of user 102's arrival at destination 106. For example, destination 106 can be a brick-and-mortar store, from which user 102 has ordered item(s) for purchase and is en route to pick up the order. Other examples of destination 106 include, but are not limited to, a restaurant, a department store, other types of service providers such as dry cleaning services, a library, etc. Therefore, it is important for server 112 to provide an arrival alert to destination 106 at a threshold time ahead of the arrival of user 102 (e.g., 8 minutes prior to user's arrival at destination 106) to ensure that the ordered item(s) is/are ready when user 102 arrives at destination 106. Therefore, the arrival alert needs to be as accurate as possible to avoid or reduce inconveniences (e.g., waiting for the ordered item(s) to be prepared for a period of time after arrival) experienced by user 102 and/or an operator at destination 106.

Destination 106 can have an operator 108 associated therewith such as an employee. Furthermore, destination 106 can have a computing device 110 with which operator 108 interacts to receive arrival alerts, send and receive identifying information to server 112 and/or track device 104, confirm/cancel/adjust orders, etc. Computing device 110 can be any known or to be developed device that is used by destination 106 and is capable of communicating with server 112 over a wired and/or wireless connection such as a WiFi connection. Examples of computing device 110 include, but are not limited to, a tablet, a stationary computer device, a mobile device, any other known or to be developed Point of Sale (POS) devices, etc.

System 100 also includes server 112. Server 112 can have one or more processors such as processor 114 capable of implementing one or more sets of computer-readable instructions stored in one or more memories such as memory 116. Execution of any one or more of these sets of instructions enable server 112 to implement functionalities of methods described below with reference to FIGS. 3-5. These functionalities include, but are not limited to, building destination specific models using machine learning, which can then be used to provide arrival prediction services, determining smart signaling for location receiving location updates, etc.

As shown in FIG. 1, server 112 can also have database 118 (can also be referred to as past trips database 118). Data stored in database 118, as will be described below, will be used by machine learning algorithms implemented by server 112 to build destination specific models and perform arrival prediction services.

System 100 can also include routing engine 120. Routing engine 120 can be any conventional routing engine such as those commonly associated with mapping applications. Such routing engines may take into account distance to a destination and speed limits and in some cases current traffic, weather and time of day conditions in providing preliminary arrival times to server 112, which will be used by server 112 and logics implemented thereon to refine, revise and provide arrival alerts to destination 106. Furthermore, routing engine 120 may or may not account for other location specific factors such as most likely routes to the destination, likely stops along the way and any other learned factors for generating destination specific models for destinations at server 112.

Server 112 and routine engine 120 can be co-located physically or be configured to communicate over wired and/or wireless networks. Furthermore, each identified component of system 100 can communicate with other components of system 100 and/or any other external component using currently known or to be developed cellular and/or wireless communication technologies and platforms.

Figure 2:
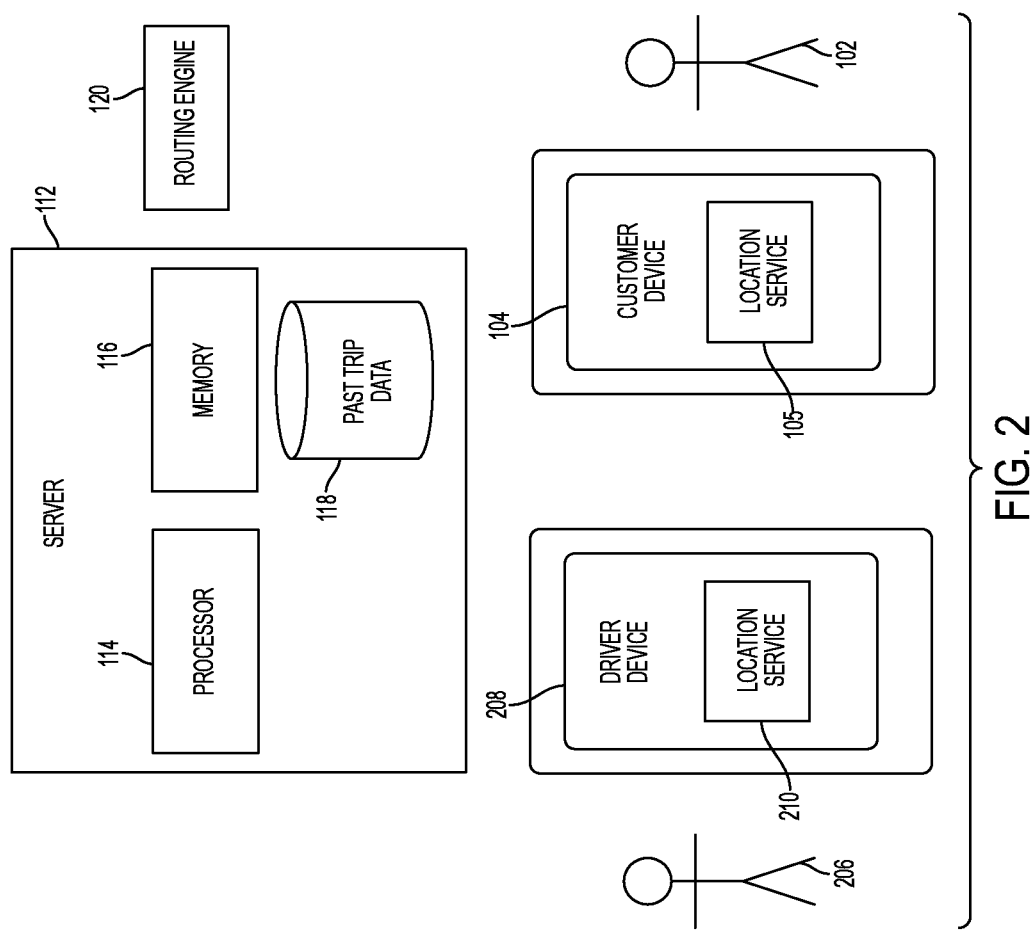
FIG. 2 shows an example system in accordance with one aspect of the present disclosure.

FIG. 2 illustrates an example system in accordance with one aspect of the present disclosure. System 200 of FIG. 2 is the same as system 100 of FIG. 1 except that instead of having user 102 travel to destination 106 to pick up item(s)/service(s) ordered as shown in FIG. 1, a destination such as destination 106 utilizes a delivery service (e.g. that of a driver) to deliver user 102's order(s) to user 102. Therefore, components of system 200 that have the same numerical reference as those in FIG. 1 will not be further described for sake of brevity.

In system 200 shown in FIG. 2, instead of destination 106 and its corresponding components, a driver 206 having an associated tracking device 208 is illustrated. In the context of FIG. 2, driver 206 and associated tracking device 208 is moving toward user 102 (similar to user 102 and tracking device 104 in FIG. 1) while user 102 is stationary (similar to destination 106 in FIG. 1). Accordingly, in the context of FIG. 2, an arrival alert is provided to user 102 informing user 102 of arrival of driver 206. Therefore, various types of calculations for location determination as described in this application, are performed for determining location of tracking device 208 and estimating its arrival at user 102.

Driver 206 and tracking device 208 can be associated with a moving object such as a vehicle operated by driver 206. Tracking device 208 can be any known or to be developed electronic device capable of tracking a movement of the driver 206 (and the associated moving object) and communicate the same with server 112 over a wired and/or wireless communication platform such as over a cellular network or a WiFi connection. Examples of tracking device 208 include, but are not limited to, a cellular phone, a personal digital assistant (PDA), a laptop, a tablet, a wristband tracking object, etc. Location service 210 of tracking device 208 can be the same as location service 105 of tracking device 104 (identified as customer device 104 in FIG. 2) described above with reference to FIG. 1.

While in FIGS. 1 and 2 various components are illustrated and described, inventive concepts are not limited thereto. For example, the number of users, devices, destinations, servers, etc., are not limited to those described and can be more or less. Furthermore, both systems 100 and 200 can have additional components, architecture and/or functionalities associated therewith that are ordinary and/or necessary for proper operations thereof and thus are within the scope of the present disclosure.

As briefly mentioned above, server 112 is tasked with tracking a moving object associated with user 102 in order to provide an alert to destination 106 at a threshold time ahead of user 102's arrival at destination 106, so that operator 108 at destination 106 can prepare and ready order(s) for user 102 to pick up when he or she arrives at destination 106. Such threshold time can be a configurable parameter determined based on various factors such as operator 108 feedback, user 102 feedback, automatic system determination based on prior trips to destination 106, etc. For example, operator 108 can request that server 112 provide operator 108 with an alert when user 102 is 8 minutes away from arriving at destination 106 for picking up his or her order(s). Therefore, server 112 needs to have precise information on user's location in order to provide, as accurately as possible, an arrival alert to operator 108 at destination 106 when user 102 is 8 minutes away from reaching destination 106.

Server 112 implements various techniques to improve the accuracy of the arrival alert provided to destination 106. For example, server 112 applies machine learning to various statistical data to create destination specific model(s) for destination 106. Various statistic data can include, but is not limited to, past completed trips of users to destination 106, past completed trips of user 102, traffic conditions, modes of transportation, types of moving objects associated with user 102 (and/or driver 206 in FIG. 2), weather conditions, times of days, events taking place en route to destination 106 or at destination 106, speed of the moving object, any construction, road closures and improvement, etc. The statistical data can be stored in database 118.

For example, a particular brick-and-mortar store maybe located in a downtown area where traffic conditions vary greatly depending on time of day. Server 112 takes this information into consideration to build a destination specific model for the brick-and-mortar store located in the downtown area. During prediction of arrival of user 102 at the downtown location of the brick-and-mortar store and depending on the time of day, server 112 can augment its prediction and improve its arrival prediction using the corresponding destination specific model.

Figure 3:
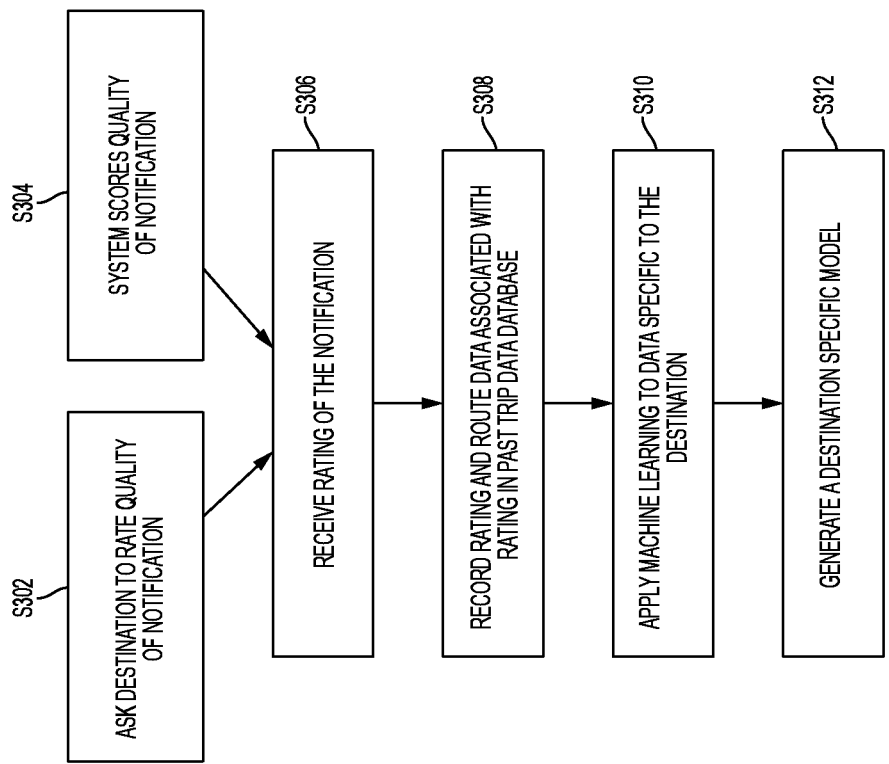
FIG. 3 illustrates an example method of creating destination specific models in accordance with one aspect of the present disclosure.

FIG. 3 illustrates an example method of creating destination specific models in accordance with one aspect of the present disclosure. FIG. 3 will be described with reference to FIG. 1. However, the concepts described are equally applicable to the system of FIG. 2 as well. The method illustrated in FIG. 3 begins after one or more notifications have been provided to destination computing device 110 regarding an arrival prediction of user 102 at destination 106 to pick up order(s) (or one or more trips to destination 106 have been completed). Server 112 can store a collection of data in database 118. The data can be any one or more of statistical data examples provided above. In addition, server 112 can store information regarding the quality of past notifications and an identifier of the past notifications. For example, every time server 112 has provided an arrival alert to destination 106 indicating that user 102 will arrive in 8 minutes, server 112 compares this estimated arrival time to an actual time it took user 102 to arrive at destination 106. For example, while server 112 predicted, at time T0, that user 102 will arrive at destination 106 in 8 minutes, in reality, it may take user 102 6 minutes from T0 to arrive at destination 106. This indicates a prediction error of 25%. Server 112 stores this prediction error in database 118. During the next round of prediction and in providing the arrival alert, server 112 adjusts its prediction by 25% before providing the arrival alert (e.g., in the particular example described above, instead of providing the arrival alert at T0, server 112 now provides the arrival alert at T1 which is 2 minutes earlier than T0).

At S302, server 112 queries computing device 110 of destination 106 for rating a quality of a recently provided arrival alert. Operator 108 operating destination computing device 110 can respond to the query. Upon receiving the response, server 112 stores the rating at S306. In addition to, simultaneously with or instead of querying computing device 110 for rating, at S304, server 112 can calculate a rating or prediction error regarding the arrival alert, as described above. Similarly, the calculated rating is received at S306.

At S308, server 112 can record the received rating(s), per S302 and S304, in database 118 in association with an identification (ID) of the notification. The ID can be an identification of a particular transaction between user 102 and a merchant at destination 106, can be an identification associated with user 102, can be an identification associated with destination 106 or any combination thereof.

Server 112 can also store in database 118, information regarding a route taken by user 102 in connection with a recently completed trip to destination 106, and any other data pertinent to the trip that resulted in the notification. The route taken by user 102 can be learned from data reported by location service 105 to server 112 while user 102 and associated computing device 104 were traveling to destination 106. In some examples, from this route information, server 112 can determine if user 102 made any stops while in route to destination 106. Server 112 can also record a time of day, day of week, and date associated with the notification in database 118. Server 112 can aggregate the above data for trips by many users.

At S310, server 112 applies machine learning algorithm(s) to the historical data specific to destination 106 stored in database 118. At S312, server 112 generates destination specific model for destination 106 based on the machine learning algorithm(s) applied to stored data at S310. In one example, destination specific model may be created or trained by analyzing factors associated with notifications that were considered of good quality and factors associated with notifications that were considered of poor quality. Since the destination specific model is generated through machine learning, some dimensions of destination specific model may not have any semantic meaning while some dimensions may have a semantic significance. For example, those dimensions having a semantic meaning can include likelihood that a user will make other stops along the route, likelihood that a user will encounter traffic along the route, the most likely routes to the destination, etc.

In some examples, machine learning may initially be trained on all data in database 118 regardless of destination to result in a location non-specific model. In such examples, destination specific model may be the result of tuning the location non-specific model for factors relevant to the specific destination 106.

As can be seen from the above description, server 112 relies on location updates received from tracking device 104 in order to determine current location of user 102, which is then used to determining/estimate the timing of sending the arrival alert to computing device 110 of destination 106.

The location updates received from tracking device 104 can be GPS signals (satellite signals) readings obtained by a GPS tracking device embedded in tracking device 104.

Server 112, by relying on data obtained from external sources such as a public database, may have a record of precise geographical coordinates of any given geographical location (latitude and longitude values). Such precise geographical coordinates may be referred to as registered geographical coordinates or simply registered coordinates of a given geographical location. Therefore, every time server 112 receives a GPS signal reading from tracking devices, server 112 can compare the GPS reading received, which includes latitude and longitude values of the corresponding geographical location, with the registered geographical coordinates of the same location. If the difference between any two of the received and registered latitude and longitude values two are within a threshold (e.g., less than 5 meters, 10 meters, within a margin of error of less than 5%, 10%, etc.), the server 112 would then consider the received coordinates as "precise".

Based on the above and over time, server 112 can build up a database of geographical areas in which average error of received GPS signals readings from tracking devices are not "precise". These geographical areas may be stored at server 112 and may be referred to as high error zones. Thereafter, whenever a tracking device is located within a high error zone, and as will be discussed below, any sparse "precise" GPS readings received from said tracking device may be used as a reference point after which determination of movement and hence the location of the tracking device may be augmented using on-board sensors and displacement/location calculations (information) of the tracking device. This can improve the location updates of the tracking device received at the server 112, which in turn improves the timing of the arrival alert that the server 112 is to provide to the destination 106, for example.

Augmenting GPS signal readings with data from on-board sensors of a tracking device not only provides the above described advantage, it can also be used to send more targeted content to the tracking device as well as track user's movement over time to determine content conversion rates, etc.

Figure 4:
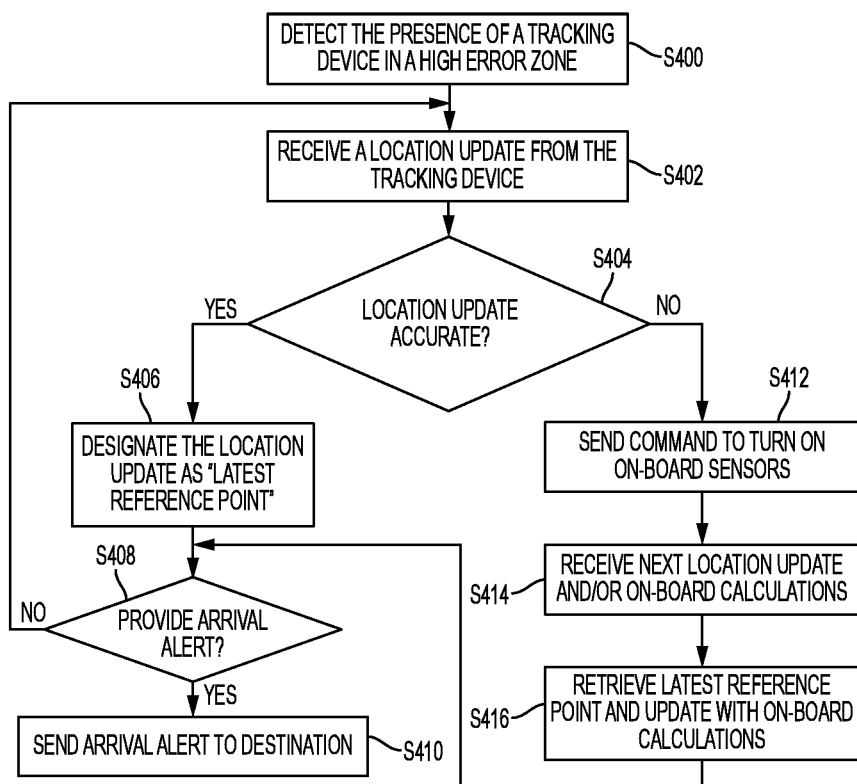
FIG. 4 illustrates an example method of location determination in high error zones, in accordance with one aspect of the present disclosure.

FIG. 4 illustrates an example method of location determination in high error zones, in accordance with one aspect of the present disclosure. FIG. 4 will be described from the perspective of server 112 and with reference to FIGS. 1-3. However, it is understood by those skill in the art that one or more processors such as processor 114 of server 112 executes computer readable instructions stored on or more memories such as memory 116 to implement the functionalities described below.

At S400, server 112 detects that tracking device 104 is in a high error zone. In one example, server 112 detects the presence of tracking device 104 in the high error zone based determining that the latest location update (or average of a predetermined number of location updates recently received from tracking device 104) corresponds to one or more geographical areas identified as high error zones by server 112, as described above.

At S402, server 112 receives a location update (e.g., a GPS signal reading) from tracking device 104 that may be indicative of a current location (geographical coordinates) of tracking device 104.

At S404, server 112 determines if the location update (GPS signal) received from tracking device 104 at S402, after detecting the presence of the tracking device 104 in the high error zone, is accurate. In one example, this accuracy determination is based on comparing the coordinates of a current location of the tracking device indicated in the received location update to registered coordinates of the same location at server 112. If the received coordinates (either longitude value or the latitude value or combination of both) are within a threshold of the registered coordinates (e.g., having an error that is less than a threshold such as 1%, 2%, 5% or a difference of less than 5 meters/miles, 10 meters/miles, etc.), then server 112 determines that the location update is accurate.

If at S404, server 112 determines that the recently received location update is accurate, at S406, server 112 updates its record of current location of tracking device 104 using the received current location and registers (stores) the current location as the "latest precise location" or the "latest reference point". This may be followed by server 112 using the updated location to track user 102 and tracking device 104 for purposes of determining the timing of the arrival alert to be sent to destination 106. Thereafter, the process reverts back to S402.

Thereafter, at S408, server 112 determines whether to provide an arrival alert to destination 106 or not. This determination is based on whether the determined location of tracking device (based on the "latest reference point" determined at S404) and the associated remaining time coincides with an arrival threshold (e.g., the $8^{th}$ minute mark example described above) at which an arrival alert is to be provided to destination 106. In other words, this determination translates into determining if the current location of tracking device 104 indicates that tracking device 104 and user 102 are at the 8 minute mark (example arrival threshold) from destination 106 such that server 112 should inform destination 106 by providing the arrival alert.

If at S408, server 112 determines that the arrival alert is to be provided, then at S410, server 112 sends the arrival alert to destination 106 (e.g., to computing device 110 associated with destination 106) using any known or to be developed communication scheme.

However, if at S408, server 112 determines that the arrival alert is not to be provided, then the process reverts back to S402 and S402, S406, S408, S410, S412, S414 and S416 are repeated, as appropriate and applicable.

Referring back to S404, if at S404, server 112 determines that the received location update is not accurate, then at S412, server 112 sends commands to tracking device 104 to turn on (activate) its on-board sensors to be used for tracking movement of the tracking device 104. Examples of such on-board sensors include, but are not limited to, gyroscope, accelerometer, magnetometer, etc. In response to the commands, tracking device 104 enables said sensors and can collect movement and location data to perform calculations on-board in order to determine the amount of displacement of tracking device 104 since activation of the sensors. These calculations can be done according to any known or to be developed method.

At S414 and at the time of providing next location update by tracking device 104, server 112 also receives the calculations performed on board tracking device 104 (may be referred to as displacement information)

At S416, server 112 retrieves the "latest reference point" (e.g., stored at S406 described above) and updates the same with the displacement information received at S410. In one example, if the process of FIG. 4, has not reached S406, by the time it reaches S416, then server 112 uses the location update of S402 instead of the "latest reference point of S406 and updates the location update from S402 with the displacement information received at S410.

In one example, the updating may also be based on the destination specific model for destination 106 that sever 112 may have generated for destination 106 per the process of FIG. 3. For example, the specific destination model for destination 106 may include information on correlation between traffic (e.g., average speed and time) on a current route of which user 102 and tracking device 104 are travelling to destination 106 and time of day. Therefore, if a particular time period (e.g., afternoon rush hour between 4 PM to 6 PM) is associated with a 10% slower traffic on the current route and the current time (as the user 102 is traveling to destination 106) falls within such time period, then server 112 may update the "latest reference point" with the displacement information and/or an additional factor of 10% due to the relatively slower traffic.

Thereafter, the process reverts back to S408 and server 112 may continuously repeat steps of FIG. 4 as described above. In one example, every time a new and "accurate" location information is received, server 112 can updates the "latest reference point" and can thereafter update the reference with displacement data calculated on-board the tracking device 104.

By implementing the method of FIG. 4, deficiencies in accuracies of GPS signals in high error zones are remedied to obtain better and more accurate location updates from tracking device 104 by augmenting GPS signal readings with on-board displacement calculations.

In another example embodiment, a high error zone may not necessarily be in a downtown area or an area with structures that block GPS signals. Instead a high error zone may be a geographical area (may be an open field or a remote region), where signal reception and strength of GPS signals are weak or less than a threshold amount of strength. Accordingly, the process of FIG. 4 is equally applicable to such remote or open field example of a high error zone.

Figure 5:
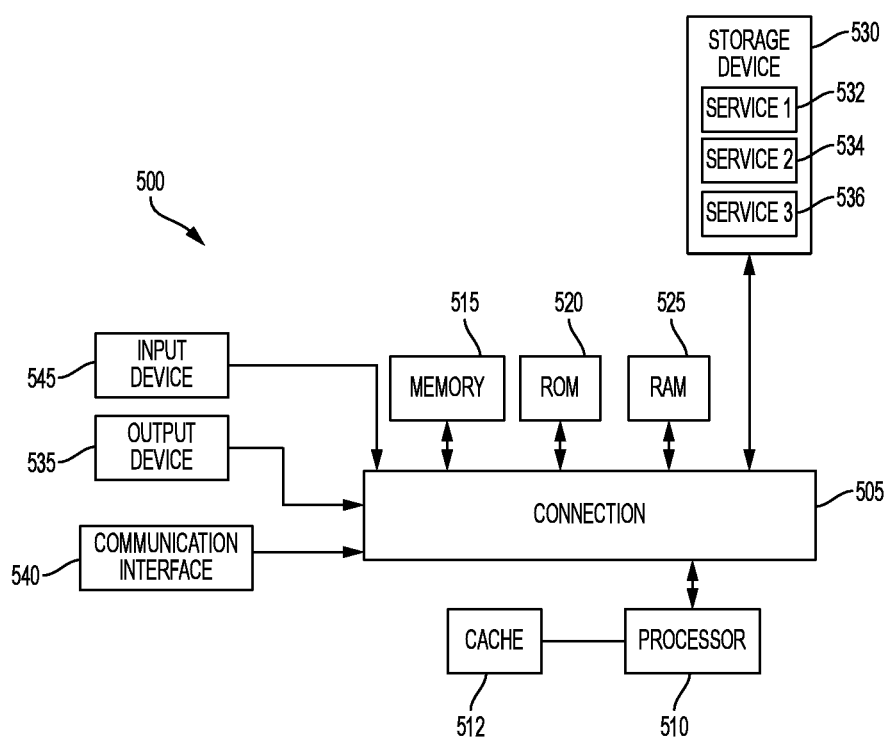
FIG. 5 shows an example of a system for implementing the present technology in accordance one aspect of the present disclosure.

FIG. 5 shows an example of a system for implementing the present technology in accordance one aspect of the present disclosure. FIG. 5 illustrates computing system 500 in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) and random access memory (RAM) to processor 510. Computing system 500 can include a cache 512 of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for location determination, the method comprising:
    detecting, at a server, presence of a tracking device in a high error zone;
    determining if geographical coordinates of a current location of the tracking device in the high error zone are within a threshold of registered geographical coordinates of the current location;
    activating at least one sensor on-board the tracking device when the geographical coordinates are not within the threshold;
    receiving displacement information of the tracking device from the tracking device;
    determining an updated location of the tracking device based on the current location and the displacement information; and
    providing an arrival alert to a destination toward which the tracking device is traveling based on the updated location.

2. The computer-implemented method of claim 1, wherein the high error zone is an area in which an average error in geographical coordinates of reported locations within the area is greater than a threshold.

3. The computer-implemented method of claim 1, wherein the at least one sensor is one or more of an accelerometer, a gyroscope or a magnetometer of the tracking device.

4. The computer-implemented method of claim 1, wherein
    the geographical coordinates include latitude and longitude of the current location; and
    the registered geographical coordinates of the current location include registered latitude and registered longitude of the current location.

5. The computer-implemented method of claim 4, wherein determining if the geographical coordinates of a current location of the tracking device are within a threshold of registered geographical coordinates of the current location, comprises at least one of:
    comparing the latitude to a corresponding registered latitude of the current location;
    comparing the longitude to a corresponding registered longitude of the current location; or
    comparing both the latitude and the longitude to the corresponding registered latitude and longitude of the current location.

6. The computer-implemented method of claim 1, wherein providing the arrival alert includes providing the arrival alert if the updated location of the tracking device indicates that a remaining time for the tracking device to reach the destination is equal to a threshold time.

7. A server comprising:
    memory having computer-readable instructions stored therein; and
    one or more processors configured to execute the computer-readable instructions to:
        detect presence of a tracking device in a high error zone;
        determine if geographical coordinates of a current location of the tracking device in the high error zone are within a threshold of registered geographical coordinates of the current location;
        activate at least one sensor on-board the tracking device when the geographical coordinates are not within the threshold;
        receive displacement information of the tracking device from the tracking device;
        determine an updated location of the tracking device based on the current location and the displacement information; and
        provide an arrival alert to a destination toward which the tracking device is traveling based on the updated location.

8. The server of claim 7, wherein prior to executing the computer-readable instructions to determine that the geographical coordinates are not within the threshold, the one or more processors are configured to execute the computer-readable instructions to:
- determine a latest reference point based on previous geographical coordinates of the tracking device being within the threshold, and
- determine the updated location based on the latest reference point and the displacement information.

9. The server of claim 7, wherein the high error zone is an area in which an average error in geographical coordinates of reported locations within the area is greater than a threshold.

10. The server of claim 7, wherein the at least one sensor is one or more of an accelerometer, a gyroscope or a magnetometer of the tracking device.

11. The server of claim 7, wherein
- the geographical coordinates include latitude and longitude of the current location; and
- the registered geographical coordinates of the current location include registered latitude and registered longitude of the current location.

12. The server of claim 11, wherein the instructions to determine if the geographical coordinates of a current location of the tracking device are within a threshold of registered geographical coordinates of the current location, comprises instructions to at least one of:
- compare the latitude to a corresponding registered latitude of the current location;
- compare the longitude to a corresponding registered longitude of the current location; or
- compare both the latitude and the longitude to the corresponding registered latitude and longitude of the current location.

13. The server of claim 7, wherein the one or more processors are configured to execute the computer-readable instruction to provide the arrival alert if the updated location of the tracking device indicates that a remaining time for the tracking device to reach the destination is equal to a threshold time.

14. One or more non-transitory computer-readable medium having computer-readable instructions stored therein, which when executed by one or more processors, cause the one or more processors to:
- detect presence of a tracking device in a high error zone;
- determine if geographical coordinates of a current location of the tracking device in the high error zone are within a threshold of registered geographical coordinates of the current location;
- activate at least one sensor on-board the tracking device when the geographical coordinates are not within the threshold;
- receive displacement information of the tracking device from the tracking device;
- determine an updated location of the tracking device based on the current location and the displacement information; and
- provide an arrival alert to a destination toward which the tracking device is traveling based on the updated location.

15. The one or more non-transitory computer-readable medium of claim 14, wherein prior to executing the computer-readable instructions to determine that the geographical coordinates are not within the threshold, the execution of the computer-readable medium cause the one or more processors to:
- determine a latest reference point based on previous geographical coordinates of the tracking device being within the threshold, and
- determine the updated location based on the latest reference point and the displacement information.

16. The one or more non-transitory computer-readable medium of claim 14, wherein the high error zone is an area in which an average error in geographical coordinates of reported locations within the area is greater than a threshold.

17. The one or more non-transitory computer-readable medium of claim 14, wherein the at least one sensor is one or more of an accelerometer, a gyroscope or a magnetometer of the tracking device.

18. The one or more non-transitory computer-readable medium of claim 14, wherein
- the geographical coordinates include latitude and longitude of the current location; and
- the registered geographical coordinates of the current location include registered latitude and registered longitude of the current location.

19. The one or more non-transitory computer-readable medium of claim 18, wherein the computer-readable instructions to determine if the geographical coordinates of a current location of the tracking device are within a threshold of registered geographical coordinates of the current location, comprise computer-readable instructions to at least one of:
- compare the latitude to a corresponding registered latitude of the current location;
- compare the longitude to a corresponding registered longitude of the current location; or
- compare both the latitude and the longitude to the corresponding registered latitude and longitude of the current location.

20. The one or more non-transitory computer-readable medium of claim 18, wherein the execution of the computer-readable instructions by the one or more processors, cause the one or more processors to provide the arrival alert if the updated location of the tracking device indicates that a remaining time for the tracking device to reach the destination is equal to a threshold time.

* * * * *